United States Patent

Mukohara et al.

(10) Patent No.: US 6,905,760 B1
(45) Date of Patent: Jun. 14, 2005

(54) POLYPROPYLENE-BASED WRAP FILM

(75) Inventors: Takafumi Mukohara, Mie (JP); Satoshi Hashimoto, Mie (JP); Takashi Nakao, Mie (JP)

(73) Assignee: Asahi Kasei Life and Living Corporation, Tokyo (JP)

( * ) Notice: Subject to any disclaimer, the term of this patent is extended or adjusted under 35 U.S.C. 154(b) by 103 days.

(21) Appl. No.: 10/650,988

(22) Filed: Aug. 29, 2003

Related U.S. Application Data

(60) Provisional application No. 60/426,040, filed on Nov. 14, 2002.

(30) Foreign Application Priority Data

Aug. 29, 2002 (JP) .................................. P. 2002-250192

(51) Int. Cl.$^7$ ............................................... B32B 27/32
(52) U.S. Cl. ...................... 428/220; 428/515; 428/516; 428/910
(58) Field of Search ............................... 428/219, 220, 428/515, 516, 910

(56) References Cited

U.S. PATENT DOCUMENTS 5,910,374 A * 6/1999 Shah ........................ 428/474.4

FOREIGN PATENT DOCUMENTS

| JP | 10-202806 A | 8/1998 |
|---|---|---|
| JP | 2001-328223 A | 11/2001 |
| JP | 2002-46238 A | 2/2002 |
| JP | 2003-19778 A | 1/2003 |

* cited by examiner

Primary Examiner—D. S. Nakarani
(74) Attorney, Agent, or Firm—Birch, Stewart, Kolasch & Birch, LLP

(57) ABSTRACT

Provided is a polypropylene-based multilayer wrap film comprising (A) a surface layer containing a first composition comprising 50 to 80 wt. % of (S1) a crystalline polypropylene-based resin and 20 to 50 wt. % of (S2) at least one softener selected from amorphous or low-crystalline propylene-α-olefin copolymers and butene-1 polymers, and based on 100 parts by weight of the first composition, 5 to 15 parts by weight of (S3) a hydrogenated terpene resin and 10 to 20 parts by weight of (S4) an aliphatic hydrocarbon which is liquid at normal temperature, and (B) a core layer which is adjacent to the surface layer and contains 80 to 98 wt. % of (C1) a crystalline polypropylene-based resin and 2 to 20 wt. % of (C2) an aliphatic hydrocarbon which is liquid at normal temperature.

6 Claims, 1 Drawing Sheet

POLYPROPYLENE-BASED WRAP FILM

This Nonprovisional application claims priority under 35 U.S.C. §119(e) on U.S. Provisional Application No. 60/426,040 filed on Nov. 14, 2002 and under 35 U.S.C. §119(a) on Patent Application No. 2002-250192 filed in JAPAN on Aug. 29, 2002, the entire contents of which are hereby incorporated by reference.

FIELD OF THE INVENTION

The present invention relates to a film used for packaging of articles such as a food packaging film. In particular, the invention pertains to a polypropylene-based wrap film that can hold the quality of causing no change in both clinging property and pulling-out ease with the passage of a certain time.

BACKGROUND OF THE INVENTION

Thin thermoplastic resin films have been used at restaurants, food shops or home when food is stored or heated in a microwave oven. Among them, a wrap film made of a vinylidene-chloride-based copolymer resin is used frequently as a food packaging wrap film, because it is equipped with excellent properties including moisture resistance, oxygen gas barrier properties, heat resistance, clinging property to a container and transparency.

In recent years, various food packaging wrap films composed mainly of a polyolefin-based resin have been proposed. Examples of such films include polyethylene-based resins, polypropylene-based resins, and poly-4-methylpentene-1 resins. The surface of these films hardly has a clinging property so that when they are used, for example, as a food packaging film, they do not cling to a container sufficiently, which is a fatal defect for them. A number of polyolefin-based films mixed with various additives or another resin, or laminated with another resin have been proposed in order to satisfy such a desired performance. They are however inferior in practical usability, because not only the clinging property to a container but also a film-to-film clinging property is heightened, which deteriorates pulling-out ease from a dispenser box.

With a view to overcoming the above-described various problems, various proposals have been made as to the clinging property of a wrap film. JP-A-10-202806 proposes a self-cohesive wrap film comprising a core layer of a polypropylene-based resin and a surface layer containing a surfactant as an adhesive. However, it is difficult to attain a high clinging property by this technique. Moreover, when a food material having a high water content is wrapped with the wrap film and heated in a microwave oven, it raises a problem of bubbling of the surfactant on the wrap film surface by the action of water.

Heightening of the clinging property leads to necessity of a high pulling-out force, while lowering of the pulling-out force leads to a deterioration in the clinging property. An increase in a modulus of elasticity, which is an index of stiffness, worsens stretching property. Thus, characteristics necessary for a wrap film tend to contradict each other. It is therefore a very difficult to problem to maintain the balance between these characteristics.

For example, JP-A-2002-46238 proposes a multilayer film which comprises a core layer comprising a resin having a barrier property, and a surface layer comprising a resin composition containing an additive having a clinging property. However, since additives to attain the clinging property have a low molecular weight or a low glass transition point, they show a phenomenon called "bleed in" and transfer in the film. As a result, in spite that the film exhibits good balance of clinging property and pulling-out ease just after film formation, the clinging property and pulling-out ease happen to be deteriorated with the passage of time owing to the transfer of the additive inwards from the surface layer.

A wrap film using a poly(4-methylpentene-1) resin has been proposed frequently, for example, in JP-A-2001-121660, because the resin has excellent heat resistance. Since the poly(4-methylpentene-1) resin is a material of high rigidity, a large amount of a plasticizer must be added to satisfy the level of flexibility which a wrap film is required to have. If it is added, however, the heat resistance or low tensile elongation at break which the resin essentially has is impaired.

SUMMARY OF THE INVENTION

An object of the present invention is to provide a wrap film which, in spite of containing a polypropylene-based resin, is excellent in a clinging property, does not require so much force to pull it out from a dispenser box and undergoes a less change in these characteristics depending on a lapse of time or storage temperature.

The present inventors have carried out an extensive investigation with a view to attaining the above-described object and completed the present invention. The present invention mainly relates to the followings:

A polypropylene-based multilayer wrap film having:

(A) a surface layer containing a first composition comprising 50 to 80 wt. % of (S1) a crystalline polypropylene-based resin and 20 to 50 wt. % of (S2) at least one softener selected from amorphous or low-crystalline propylene-α-olefin copolymers and butene-1 polymers, and, based on 100 parts by weight of the first composition, 5 to 15 parts by weight of (S3) a hydrogenated terpene resin and 10 to 20 parts by weight of (S4) an aliphatic hydrocarbon which is in liquid at normal temperature; and (B) a core layer containing 80 to 98 wt. % of (C1) a crystalline polypropylene-based resin and 2 to 20 wt. % of (C2) an aliphatic hydrocarbon which is liquid at normal temperature;

The above-described polypropylene-based multilayer wrap film, wherein between before and after the wrap film wound around a paper tube is allowed to stand for 3 weeks at 40° C. and RH of 20%, a change in a cling energy falls within a range of from −20 to +50% and a change in a pulling-out force falls within a range of from −50 to +20%; and The above-described polypropylene-based multilayer wrap film which has a structure formed of a fibril network and a matrix existing therebetween when the film surface is observed as a phase image of an atomic force microscope at 40,000 magnifications, and the fibril has an average width of 1 nm or greater but not greater than 100 nm and has an average pore size of 3 nm or greater but not greater than 1 µm.

By specifying the wrap film of the present invention as described above, it exhibits the following advantages. Described specifically, use, for the surface layer of the wrap film, of a resin composition containing predetermined amounts of a specific softener, a hydrogenated terpene resin and an aliphatic hydrocarbon which is liquid at normal temperature makes it possible to plasticize the resin appropriately, thereby attaining both clinging property and pulling-out ease.

Addition of an aliphatic hydrocarbon which is liquid at normal temperature to a core layer (B) which is contiguous to the surface layer (A) makes it possible to suppress a reduction in the time-dependent deterioration of both clinging property and pulling-out ease.

BRIEF DESCRIPTION OF THE DRAWING

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
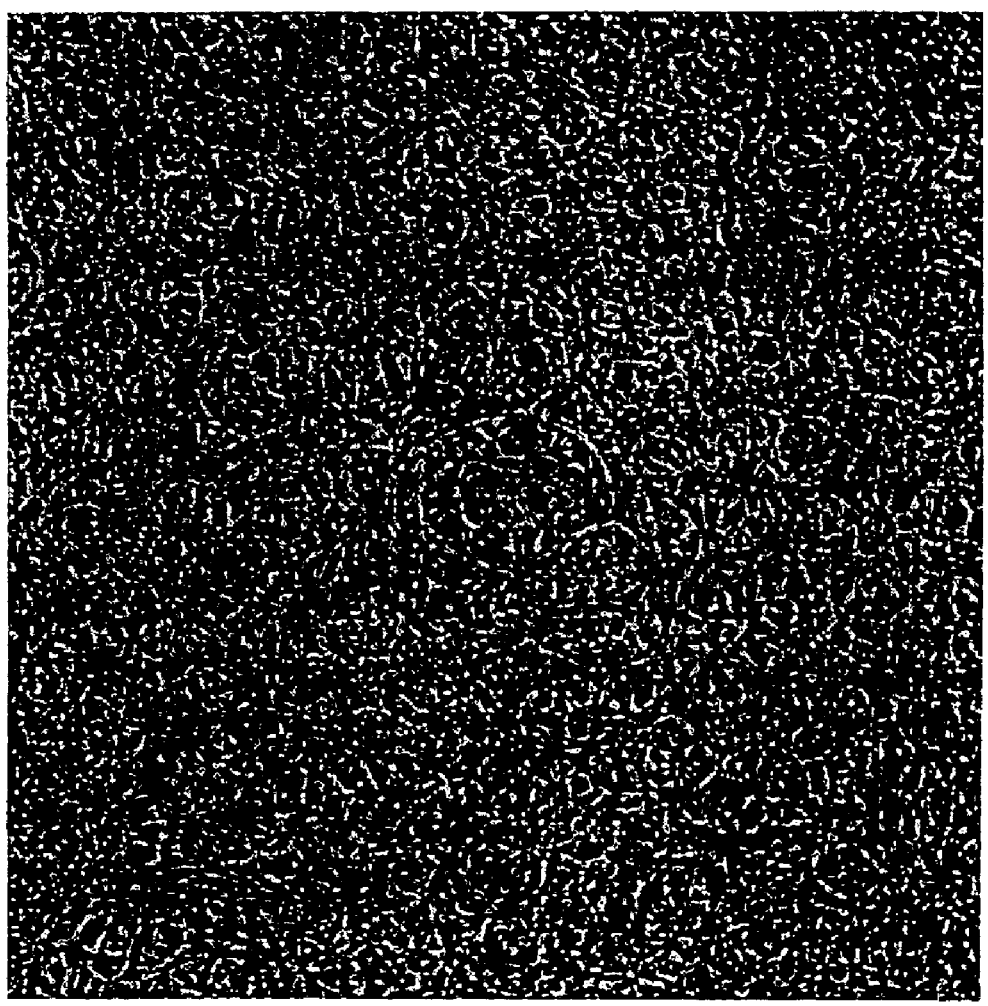
FIG. 1 is a photograph of the wrap film of the present invention observed as a phase image of an atomic force microscope at 40,000 magnifications.

The present invention will hereinafter be described specifically.

The polypropylene-based resin to be used in the present invention may be a homopolymer having, in the molecular chain thereof, only a polypropylene unit or a binary or tertiary copolymer having, in addition, ethylene or butene-1. Of the copolymers, those obtained by random copolymerization are preferred from the viewpoint of transparency. With regards to stereoregularity, either one of an isotactic or syndiotactic structure, or a mixture thereof may be used. Although no other particular limitation is imposed, it has preferably comes up to the food package standards in consideration that it is safely used for wrapping food. In addition, it has preferably a melt flow rate ranging from 1 to 20 g/10 minutes as measured at 230° C. under a load of 2.16 kg by the method in accordance with ASTM D1238.

The component to be used as a softener contained in the surface layer (A) is selected from amorphous or low-crystalline propylene-α-olefin copolymers and butene-1 polymers. From the viewpoint of safety, it preferably has come up to the food package standards.

The term "amorphous or low-crystalline propylene-α-olefin copolymer" as used herein means a copolymer of propylene and an α-olefin having at least 4 carbon atoms such as butene-1 or pentene-1. Its propylene percentage preferably ranges from 65 wt. % to 85 wt. %. Its melt flow rate preferably ranges from 1 to 10 g/10 minutes as measured at 230° C. under a load of 2.16 kg by the method in accordance with ASTM D1238. Its density in accordance with ASTM D1505 preferably ranges from 0.85 to 0.89 g/cm$^3$. It is rich in flexibility by itself and when incorporated in a crystalline polypropylene-based resin, it does not lose its transparency and can bring about softening effects. Examples of the amorphous or low-crystalline polypropylene-α-olefin copolymer include "TAFMER XR" (trade name; product of Mitsui Chemicals, Inc.).

The term "butene-1 polymer" means a homopolymer obtained by catalytic polymerization of a liquid butene-1 monomer. Its melt flow rate preferably falls within a range of from 0.1 to 5 g/10 minutes as measured at 190° C. under a load of 2.16 kg by the method in accordance with ASTM D1238. Its density preferably falls within a range of 0.904 to 0.920 g/cm$^3$ in accordance with ASTM D1505.

The above-described softener has good compatibility with the crystalline polypropylene-based resin. Addition of it in an appropriate amount is effective for reducing a modulus in tension or flexural modulus, in other words, for imparting flexibility without greatly impairing transparency, humidity resistance and heat resistance which the crystalline polypropylene-based resin essentially has.

Supposing that the total amount of the crystalline polypropylene-based resin and softener is 100 wt. %, the softener is added in an amount of 20 wt. % or greater from the viewpoints of the flexibility, hand feeling, and an ability to follow the contour of an article to be wrapped, each of the resulting film, and in an amount not greater than 50 wt. % from the viewpoints of stable film forming property, processability, appearance or quality of the film as a product, stiff feeling and handling ease as a packaging film. The amount is more preferably from 20 to 40 wt. %, still more preferably from 20 to 30 wt. %.

The hydrogenated terpene resin serving another component of the surface layer (A) has been employed as an adhesive.

The hydrogenated terpene resin is obtained by hydrogenation of a homopolymer using, as a raw material, α-pinene, β-pinene, limonene or dipentene available from the bark of pine or peel of oranges, or hydrogenation of a copolymer thereof. The softening point of the hydrogenated terpene resin is preferably 120° C. or greater from the viewpoint of the stickiness of the resulting film and is preferably 135° C. or less from the viewpoints of flexibility and clinging property of a portion of the surface layer (A) containing it. Supposing that the amount of the resin composition comprising the crystalline polypropylene-based resin and softener is 100 parts by weight, the hydrogenated terpene resin is added in an amount of 5 parts by weight or greater from the viewpoint of a clinging performance and in an amount of 15 parts by weight or less from the viewpoint of suppressing the film-to-film blocking, thereby lowering a pulling-out force. The amount preferably ranges from 5 to 10 parts by weight, more preferably from 5 to 8 parts by weight.

The aliphatic hydrocarbon, which is liquid at normal temperature, and which is contained in the surface layer (A), is used as an adhesion assistant. As the adhesion assistant, added is at least one of saturated hydrocarbons obtained by purification of a crude oil, such as liquid paraffin, mineral oil, and white mineral oil, polyisobutylene obtained by homopolymerization of isobutene and polybutene obtained by copolymerization of isobutene and n-butene. Of these, mineral oil is most preferred. Supposing that the amount of the composition comprising the crystalline polypropylene-based resin and softener is 100 parts by weight, the adhesion assistant is added in an amount of 10 parts by weight or greater but not greater than 20 parts by weight from the viewpoints of hand feeling and stable clinging property. Amounts of 15 parts by weight or greater are more preferred.

The wrap film of the present invention has a high clinging property and is excellent in pulling-out ease by using, in combination, the hydrogenated terpene resin serving as an adhesive and the aliphatic hydrocarbon which is liquid at normal temperature and serves as an adhesion assistant. When the wrap film contains an excess hydrogenated terpene resin as the conventional one does, it can have a clinging property by strongly pressing films each other, but the film is inferior in clinging property and pulling-out ease when pressed under a low load. When the film contains an excess aliphatic hydrocarbon, which is liquid at normal temperature, on the other hand, the film has an excessively plasticized surface and cannot attain desired high clinging property.

When the hydrogenated terpene resin and the aliphatic hydrocarbon, which is liquid at normal temperature, each being a component of the surface layer (A), are added in amounts of c parts by weight and d parts by weight, respectively, and if they satisfy the following equation:

$$d \geq 0.75 \times c + 3.8,$$

better clinging property and pulling-out ease can be attained. In other words, by mixing the hydrogenated terpene resin (S3) with the aliphatic hydrocarbon (S4), which is liquid at normal temperature, at a specific ratio, the resulting film is able to have an appropriately plasticized surface, and exhibit better clinging property and pulling-out ease.

To the surface layer (A) comprising the polypropylene-based resin composition, a known additive such as antioxidant can be added in an amount not departing from the object of the present invention. It is however preferred that the additive does not contain an aliphatic ester of an aliphatic polyhydric alcohol such as glycerin fatty acid ester. The additive is used for an antifogging, plasticizing, processability improving or antistatic purpose. As described above, when a wet food material is wrapped with a film containing such. an aliphatic ester and heated in a microwave oven, foams happen to appear on the wrap surface and cause discomfort to users.

The film of the present invention has a core layer (B) adjacent to the surface layer (A). Such a structure makes it possible to prevent formation of a density gradient, which will otherwise occur by the transfer, to the core layer (B), of the aliphatic hydrocarbon of the surface layer (A) being liquid at normal temperature by a bleeding phenomenon, thereby keeping only a sufficient amount of the aliphatic hydrocarbon in the surface layer. The crystalline polypropylene-based resin forming the core layer (B) may be similar to that employed in the surface layer (A). It preferably comes up to the standards for food package.

The aliphatic hydrocarbon (C2) which is liquid at normal temperature and which is to be used for the core layer (B) of the present invention, is a saturated hydrocarbon such as liquid paraffin, mineral oil or white mineral oil. Although no particular limitation is imposed on the physical properties of it, it is usually preferred that the aliphatic hydrocarbon has a dynamic viscosity at 40° C. of from 10 to 80 cSt, more preferably, from 10 to 40 cSt.

Supposing that the total amount of the crystalline polypropylene-based resin (C1) and the aliphatic hydrocarbon (C2) which is liquid at normal temperature is 100 wt. %, the latter is added in an amount of 2 wt. % or greater in order to suppress a bleeding-in phenomenon and maintain clinging property • pulling-out ease even after the passage of time and in an amount of 20 wt. % or less from the viewpoint of the stiffness and stable film forming property. It is added preferably in an amount of from 2 to 15 wt. %, more preferably from 2 to 12 wt. %.

Owing to the bleeding-in phenomenon, the aliphatic hydrocarbon of the surface layer (A), which is liquid at normal temperature, transfers from the surface layer (A) to the core layer (B), leading to a decline in the percentage of the aliphatic hydrocarbon relative to the hydrogenated terpene resin in the surface layer (A). This causes a change in the clinging property and pulling-out ease which have been obtained in the initial stage. A rise in the constitution ratio of the surface layer (A) can be considered easily as a countermeasure against the bleeding-in phenomenon, but the surface layer (A) has a softness attaining composition in order to exhibit high clinging property. Such a countermeasure therefore lowers the modulus of elasticity of the whole film, thereby causing a drastic deterioration in the stiffness. In the present invention, therefore, clinging property and pulling-out ease can be maintained without causing a drastic deterioration in the modulus of elasticity of the whole film by adding a specific amount of a low-viscosity aliphatic hydrocarbon to the core layer (B) adjacent to the surface layer (A) to prevent the bleeding-in phenomenon.

The bleeding-in phenomenon of the aliphatic hydrocarbon of the surface layer (A) can be controlled well in the following manner. Supposing that the amount of the aliphatic hydrocarbon of the surface layer (A), which is liquid at normal temperature, is d parts by weight, the amount of the aliphatic hydrocarbon of the core layer (B) which is liquid at normal temperature is e wt. % and a volumetric percentage of the surface layer (A) (total, if the surface layer is provided on both sides of the core layer (B)) to the core layer (B) is f, when the amounts satisfy the following equation:

$$0.13 \times d/(3 \sqrt{f}) \leq e \leq 0.66 \times d,$$

the film has satisfactory stiffness while maintaining good clinging property and pulling-out ease.

The core layer (B) is preferably free of a resin having a melt peak temperature of 200° C. or greater. Addition of a resin having a high melt peak temperature such as a poly(4-methylpentene-1) resin actualizes heat resistance as high as 170° C. or greater, but it simultaneously raises a modulus of elasticity of the resulting film. As a result, not only the desired clinging property cannot be attained but also handling ease including stiffness becomes inferior.

In order to maintain moldability or formability, a known additive such as antioxidant may be added to the composition of the core layer (B) within an extent not departing from the object of the present invention.

With regards to a layer constitution ratio, supposing that the volumetric ratio of the surface layer (A) to the core layer (B) is f, the f preferably ranges from 0.2 to 2.7. When the volumetric ratio of the surface layer (A) is less than 0.2, the clinging property is not exhibited over the whole film. When it exceeds 2.7, on the other hand, the film becomes inferior in handling ease, because it becomes soft and has lowered stiffness.

Although no particular limitation is imposed on a ratio of the surface layer (A) when it lies on both sides of the core layer, almost an equal ratio is preferred, because it is not necessary to distinguish which side is which.

A multilayer film may have, in addition to the surface layer (A) and the core layer (B), another layer such as a rework layer comprising, for example, a trim edge formed upon preparation, within an extent not inhibiting the object of the present invention. In consideration of the balance between the clinging property and pulling-out ease, the other layer is preferably 5 wt. % or less of the whole layer and at the same time, 5% or less of the whole volumetric ratio. The other layer must be stacked so as not to disturb the contiguous state of the surface layer (A) and core layer (B).

As an index relating to the clinging property of the wrap film of the present invention, the term "cling energy" is employed. The term "cling energy" is an index for evaluating film-to-film or film-to-container clinging property when a container or food is covered with a wrap film. This clinging property is, as well as pulling-out ease, an important property of the wrap film as described above. The above-described cling energy is determined from an energy required for separating adhered films each another. A detailed measurement method will be described later. This cling energy is preferably from 1.0 to 3.0 mJ, more preferably from 1.5 to 2.5 mJ from the viewpoint of sufficient clinging property.

The "pulling-out force" of the wrap film used in the present invention is a property as important as the clinging property and by it, pulling-out ease of a film from a film roll in a dispenser box is evaluated. The pulling-out force is measured in a manner described later. This pulling-out force is preferably from 200 to 1000 mN, more preferably from 200 to 800 mN, still more preferably from 200 to 600 mN from the viewpoint of good pulling-out ease.

Wrap films are sometimes stored under high temperature and high humidity conditions, for example, kitchen at home or cooking place for business use. It is preferred that they do not undergo a large change in the cling energy and pulling-out force during storage. As an index of the change, employed is a rate of change in the cling energy or pulling-out force of the wrap film wound around a paper tube between before and after it is allowed to stand at 40° C. under relative humidity of 20% for 3 weeks. The rate of change in the cling energy preferably ranges from −20 to +50%, while that in the pulling-out force preferably ranges from −50 to +20%. Within these ranges, the good balance between the clinging property and pulling-out ease will not be lost during the term until the wrap film is delivered and consumed as a product.

The surface of the film of the present invention preferably has a predetermined structure when the information of the phase caused by the stimulation of an atomic force microscope (AFM) cantilever is imaged. When the information of the phase caused by the stimulation of an cantilever is observed at 40,000-fold magnification, a portion with small delay, in other words, a hard portion is indicated by a light phase image, while a portion of large delay, that is, a soft portion is indicated by a dark phase image. When the desired surface of the wrap film of the present invention is observed by the above-described method, there exist a fibrous network structure and a matrix existing therebetween. The image thus observed is illustrated in FIG. 1. The "network structure" is a continuous portion of the image which seems light, while the "matrix" is a discontinuous portion which is encompassed by this network structure and seems dark. The fibrous light portion which can be observed continuously is called "fibril network structure", while the discontinuous dark portion is called "matrix". From a region of 10 mm×10 mm, 50 images having a size of 2 micron×2 micron are selected at random. From these images, a portion which is most uniform in fibril width and fibril-to-fibril distance is extracted. From thus extracted image, 100 fibril widths and 100 fibril-to-fibril distances are selected and averages of them except the top 10 and bottom 10 are calculated and regarded respectively as the fibril width and size of matrix which will be described later.

The average fibril width preferably ranges from 1 nm or greater but not greater than 100 nm. Within this range, the smoothness of the film surface can be maintained, leading to a further improvement in the clinging property. The average width more preferably ranges from 10 nm or greater but not greater than 50 nm.

The size of the matrix (that is, average of the fibril-to-fibril distance) preferably ranges from 3 nm or greater but not greater than 1 $\mu$m. Within this range, the adhesion component constituting the matrix is retained in the network structure on the film surface, does not appear on the surface more than necessary, and a balance between clinging property and pulling-out ease can be kept. The matrix size more preferably ranges from 10 nm or greater but not greater than 50 nm.

In the network structure of the present invention, the crystalline portion of the propylene-based resin mainly forms fibril, while the amorphous portion of the propylene-based resin, softener, hydrogenated terpene resin and aliphatic hydrocarbon being liquid at normal temperature mainly form the matrix. As described above, since the fibril has a network structure of a predetermined size, a softened component of the matrix portion having a large influence on the clinging property is retained by the fibril, and its amount existing on the surface is only the minimum amount necessary for the exhibition of the clinging property, making it possible to exhibit both good clinging property and pulling-out ease.

When a softened component exists locally on a film surface free of a network structure, or when a softened portion exists, as an sea-island structure, in the form larger in size than the pore of the network structure specified by the present invention, clinging-property-imparting components do not exist uniformly on the surface, leading to a deterioration in the balance between the clinging property and pulling-out ease.

The film of the present invention preferably has predetermined flexibility. More specifically, it has preferably a modulus in tension of 200 to 1000 MPa. The modulus in tension is determined by measuring, in accordance with the method described in ASTM-D-882, an average of modulus in tension at 2% strain of the film in a machine direction (MD direction) and transverse direction (TD direction which is perpendicular to the MD direction) by using a tensile tester (universal tensile compression tester of Shinko Tsushin Kogyosha). The modulus in tension is preferably 200 MPa or greater from the viewpoints of flexibility, stiffness and handling ease of the film and not greater than 1000 MPa from the viewpoints of flexibility, clinging property and handling ease. It is more preferably 400 MPa or greater but less than 700 MPa.

The thickness of the film of the present invention is preferably 3 $\mu$m or greater from the viewpoints of strength and stiffness as a packaging film and handling ease upon packaging but not greater than 25 $\mu$m from the viewpoints of clinging property to articles to be packaged, handling ease of the film, weight and roll diameter of it as a wrap film for home use and handling ease upon use. In particular, a food wrap film for home use which is required to be convenient, having clinging property and pulling-out ease has preferably a thickness of from 6 $\mu$m to 15 $\mu$m.

For the preparation of the present film, a known film formation process can be employed. The polypropylene-based resin composition of the surface layer (A) is prepared by melting and kneading in an extruder. The softener and hydrogenated terpene resin which are in the solid form at normal temperature are charged in a predetermined amount in a blender, together with commercially-available polypropylene-based resin pellets. After sufficient and uniform mixing, the mixture thus obtained is then charged in the extruder for the surface layer. The aliphatic hydrocarbons of the surface layer (A) and core layer (B) are liquids at normal temperature so that on the halfway of the screw of each of the surface-layer and core-layer extruders, liquid injectors are installed to add them to the molten and plasticized resins. The compositions are made uniform by kneading under appropriate extruding conditions and they are extruded from a multilayer die or the like into a multilayer film having a surface layer and a core layer, and optionally a rework layer. It is also possible to sufficiently melt and knead respective compositions for the surface layer (A) and core layer (B) in a known apparatus such as twin-screw extruder permitting midway addition, pelletize the resulting masses and then pour them in the respective extruders for the surface layer and core layer.

A film having a multilayer structure, for example, a three-layer structure can be prepared in the following manner. In the above-described extruders for the surface layer and core layer arranged in parallel, predetermined resins are charged, respectively, followed by sufficient melting and kneading. Downstream of them, the resins from these extruders are merged to have three layers, followed by extrusion in the form of a sheet by using a cyclic dye or a T die having a slit-like discharge port. The resin thus extruded is solidified by cooling in a known manner such as passing it through a cooling water tank or bringing it in contact with a cold wind or a cooling roll. The cooling temperature of the extruded sheet surface is preferably 10° C. or greater from the viewpoints of surface smoothness and appearance but not greater than 50° C. from the viewpoints of prevention of the bleeding phenomenon on the surface due to the adhesive incorporated in the surface layer (A) or clinging property.

It is preferred to stretch the film by an ordinarily employed known method such as monoaxial or biaxial stretching by a roll method or tenter method, or a multiaxial stretching by a tubular method at a stretching ratio of at least 2 in the machine direction and/or transverse direction in consideration of the strength as a film and cutting ease of the film used as a food packaging wrap film. The stretching ratio is not necessarily same between the machine and transverse directions. More preferred is stretching at a stretching ratio of at least 2 in the machine and transverse directions by multiaxial stretching by the tubular method. After completion of the stretching, the film is formed into an intended shape by trimming the end of the film, cutting the film into a desired size, or winding it around a paper tube.

The film obtained by multiaxial stretching by the tubular method may be heat set in a known manner in order to adjust a thermal shrinkage ratio of the film. Examples of the method usable for this purpose include indirect heating by contact heating from a roll or by infrared rays while restraining the movement of the film in the MD direction; heating with a hot wind or radiation heat while restraining the movement of the film in the transverse direction by a tenter; and heating with a hot wind or radiation heat while forming bubbles again.

The film according to the present invention is excellent in, not only the balance between the clinging property and pulling-out ease which a wrap film is required to have, but also transparency, heat resistance, appropriate flexibility, good hand feeling, cutting ease and safety so that it is used suitably as a food wrap film for home use.

EXAMPLES

The modes for carrying out the present invention will hereinafter be described. They are each a mode according to the present invention and the invention is not limited by these Examples. The performances of the films available by the present invention and comparative examples will be evaluated in the following manner.

(Cling Energy)

Film-to-film clinging property when a container such as dish or food was covered with a wrap film was evaluated and measurement was conducted in the following manner.

Two Columns having a bottom area of 25 cm² and a weight of 400 g were prepared. To their bottom surfaces, filter papers having the same area were adhered respectively in advance. At each of the bottom surfaces to which the filter paper had been adhered, a wrap film was fixed under tension so as to avoid wrinkles from appearing in the film. After these two columns were fitted closely with their film surfaces inside and contact bonded under a load of 500 g for 1 minute under the conditions of 23° C. and RH of 50%. Then, the films overlapped were separated in a direction vertical to the surface at a rate of 5 mm/min by a tensile tester (universal tensile compression tester of Shinko Tsushin Kogyosha) and the energy (mJ) generated at this time was designated as cling energy.

(Change in Cling Energy)

Stability of the cling energy with the passage of time was evaluated. The cling energy of a wrap film which had passed 24 hours at 23° C. and RH of 50% after formation and the cling energy of this wrap film which had been stored for 21 days under an atmosphere of 40° C. and RH of 20% were measured by the above-described method.

The cling energy before storage was evaluated in accordance with the following criteria:

A: 1.5 mJ or greater but less than 2.5 mJ

B: 0.5 mJ or greater but less than 1.5 mJ, or 2.5 mJ or greater but less than 3.5 mJ C: 3.5 mJ or greater but less than 4.0 mJ D: less than 0.5 mJ, or 4.0 mJ or greater A change of the wrap film in cling energy between before and after storage for 21 days under an atmosphere of 40° C. and RH 20% was evaluated in the following criteria:

A: $-20\% \leq$ (change) $<+50\%$

B: $-50\% \leq$ (change) $<-20\%$, or $+50\% \leq$ (change) $<+75\%$

C: (change) $<-50\%$, or $+75\% \leq$ (change)

D: unmeasurable because the film could not be pulled out (Pulling-out Force)

Pulling-out ease of a wrap film from a film roll was evaluated in the following manner.

A film slit to have a width of 300 mm was wound around a paper tube having an outer diameter of 41 mm, an inner diameter of 38 mm and width of 308 mm under tension of 20N at a rate of 100 m/min and a film roll having a film length of 20 m was prepared.

Both ends of the paper tube of the above-described film roll were sandwiched and fixed by an exclusively used jig having a rotary portion which turns under a light load and this jig was fixed at the lower part of a tensile tester (universal tensile compression tester of Shinko Tsushin Kogyosha). The end portion of the film was adhered to and fixed at an upper fixing tool of 330 mm wide and a force available upon unwinding the film at a rate of 1000 mm/min was measured. The maximum load at this time was designated as a pulling-out power.

In order to find a time-dependent change of the pulling-out force, the pulling-out force of the sample 24 hours after formation and that of the sample 21 days after storage under an atmosphere of 40° C. and RH of 20% were measured.

The pulling-out force before storage was evaluated in accordance with the following criteria:

A: 50 mN or greater but less than 600 mN

B: 600 mN or greater but less than 1200 mN

C: 1200 mN or greater but less than 1500 mN

D: less than 50 mN, or 1500 mN or greater

The pulling-out force of the sample after storage for 21 days under an atmosphere of 40° C. and RH of 20% compared with that before storage was evaluated in accordance with the following criteria:

A: $-50\% \leq$ (change) $<+20\%$

B: $-80\% \leq$ (change) $<-50\%$, or $+20\% \leq$ (change) $<+50\%$

C: (change) $<-80\%$, or $+50\% \leq$ (change)

D: unmeasurable because the film could not be pulled out (Transparency)

The cloudiness of a film was measured using "NDH-300A" (Nippon Denshoku Industries, Ltd.) in accordance with the method described in ASTM-D-103 and transparency was evaluated based on the following criteria.

A: less than 1.0

B: 1.0 or greater but less than 2.0

C: 2.0 or greater but less than 3.0

D: 3.0 or greater (Heat resistance)

For evaluation of heat resistance, heat resistant temperature was measured based on Tokyo Consumer Life Ordinance, Article 11. A film having a heat resistant temperature of 140° C. or greater was ranked A, that having a heat resistant temperature of 130° C. or 135° C. was ranked B and that having a heat resistant temperature of 125° C. or less was ranked C.

(Flexibility)

For evaluation of flexibility, moduluses of tension of a film in the machine direction (MD) and transverse direction (TD) upon 2% strain were measured using a tensile tester (universal tensile compression tester of Shinko Tsushin Kogyosh) in accordance with the method described in ASTM D882. It was evaluated based on the following criteria:

In the average of the moduluses in tension of the film in the MD and TD directions, A: 400 MPa or greater but less than 700 MPa B: 200 MPa or greater but less than 400 MPa, or 700 MPa or greater but less than 1000 MPa C: 100 MPa or greater but less than 200 MPa D: less than 100 MPa, or 1000 MPa or greater (Hand Feeling)

For evaluation of hand feeling, 50 homemakers selected at random were asked to carry out organoleptic evaluation of the hand feeling of a film and evaluation was made based on the following criteria:

A: at least 45 homemakers judged that the film had good hand feeling.

B: 40 or greater but less than 45 homemakers judged that the film had good hand feeling.

C: 30 or greater but less than 40 homemakers judged that the film had good hand feeling.

D: less than 30 homemakers judged that the film had good hand feeling.

(Cutting property)

A film was wound around a paper tube to have a width of 300 mm and roll length of 20 m and the resulting film roll was put in a dispenser box of "Saran Wrap" (trade name; product of Asahi Kasei Corporation). The film was cut by a blade attached to the box. The cutting property of the film was evaluated from how the film was cut based on the following criteria.

A: The film can be cut sharply with a light force.

B: Some force is necessary for cutting but the film can be cut sharply.

C: The film can be cut but not easily.

D: The film cannot be cut smoothly. Sometimes it is not cut but stretched or broken transversely, or the dispenser box is broken owing to an excessive load applied upon film cutting.

(Observation of the Film Surface)

The film surface was observed as a phase image obtained by an atomic force microscope. The film was adhered and fixed to a glass and the surface was observed as a phase image in a Tapping mode by "Nano Scope IIIa" (trade name; product of Digital Instrument). Measurement was conducted using a cantilever (spring constant: 0.07 to 0.58 N/m) of Si single crystal under the conditions of a scan rate of 0.5 to 1 Hz, scan size of 2 $\mu$m, Z limit of 440V and sampling points of 512512. When the contact pressure of the cantilever was controlled, depending on the film, set point ranged from 0.8 to 1.4V at a target amplitude of 2V and set point ranged from 2.0 to 3.5V at a target amplitude of 4V. From a 10 mm×10 mm region of the sample, 50 images of 2 $\mu$m×2 $\mu$m were selected at random and observed. Out of these images, a portion which was most uniform in fibril width and fibril-to-fibril distance was extracted. The 2 $\mu$m×2 $\mu$m field thus extracted was enlarged by 40,000 times and from the resulting 80 mm×80 mm image, 100 fibril widths and 100 fibril-to-fibril distances were selected. Average of 80 widths or 80 distances after the top 10 and the bottom 10 were omitted was adopted. The surface structure was evaluated in terms of average fibril width based on the following criteria:

A: 1 nm or greater but less than 50 nm

B: 50 nm or greater but less than 100 nm

C: 100 nm or greater.

The average fibril-to-fibril distance was evaluated based on the following criteria:

A: 10 nm or greater but less than 50 nm

B: 3 nm or greater but less than 10 nm, or 50 nm or greater but less than 1000 nm C: less than 3 nm, or 1000 nm or greater The film was evaluated synthetically based on the above-described results. The film ranked A in each item was judged excellent, that ranked only A or B was judged practically usable, and that having a ranking of C or D was not suited for practical use.

Example 1

A crystalline polypropylene-based resin ("Grand Polypro F327", trade name; product of Grand Polymer Co., Ltd., a tertiary copolymer of propylene, ethylene and butene-1) and, as a softener, a low-crystalline propylene-α-olefin copolymer resin ("TAFMER XR110T", trade name; product of Mitsui Chemicals, Inc.) were mixed at a weight ratio of 75:25. To 100 parts by weight of the resulting mixture, 5 parts by weight of a hydrogenated terpene resin ("Clearon P125", trade name; product of Yasuhara Chemical Co., Ltd.) was charged in a blender, followed by thorough mixing for 5 minutes at normal temperature. The resulting mixture was kneaded under a molten state in a co-rotating twin screw extruder ("TEM-35BS", trade name; product of Toshiba Machine) having a screw diameter of 37 mm and L/D of 42, whereby pellets were prepared. As the aliphatic hydrocarbon, which is liquid at normal temperature, a mineral oil ("MORESCO white P70", trade name; product of Matsumura Oil Research /(dynamic viscosity at 40° C. of 9.6 cSt)) was added through an injection pump from the midway of a barrel. It was added in an amount of 15 parts by weight based on 100 parts by weight in total of the crystalline polypropylene-based resin and softener. The resulting mixture was a resin for surface layer.

The same crystalline polypropylene-based resin as employed above was molten in a co-rotating twin screw extruder ("TEM-35BS", trade name; product of Toshiba Machine) having a screw diameter of 37 mm and L/D of 30 and from the midway of the extruder, 20 parts by weight of a mineral oil ("MORESCO white P70", trade name; product of Matsumura Oil Research) was added through an injection pump. Their amounts were adjusted so that the weight ratio of the crystalline polypropylene-based resin to the mineral oil would be 90:10. The resulting composition was mixed uniformly and the pellets thus obtained were prepared as a core layer resin. The volumetric ratio of each layer and the like are shown in Table 1.

A multilayer stretched film was formed using the resins thus obtained. First, the resin mixtures were charged, respectively, in a surface-layer extruding unit and a core-layer extruding unit of a multilayer extruder capable of extruding three layers of two kinds into a symmetric resin layer constitution. After sufficient molding in each extruding unit, a raw film was extruded through a multilayer cyclic dye at 220° C., followed by cooling by water.

The resulting raw film was stretched at 120° C. by a tubular orientation machine at a stretching rate of 5 in the machine direction and 4 in the transverse direction. Then, the end portion of the cylindrical film was trimmed and the film was taken up one by one. By a tenter whose clip for restraining the film in the machine direction was set at a predetermined width, the film was heat set at a hot air temperature of 130° C. for a residence time of 20 seconds. As a result, an almost uniform film of 10 μm thick having a surface layer of 0.25 μm thick, a core layer of 0.5 μm thick and another surface layer of 0.25 μm thick was obtained. As a result of measuring physical properties of this film, it exhibits good performances as shown in Table 2. When the film thus obtained was observed at 40,000 magnifications as a phase image of an atomic force microscope, a structure formed of a network fibril and a matrix existing therebetween was observed.

Example 2

In the same manner as in Example 1 except that the crystalline polypropylene-based resin and the low-crystalline propylene-α-olefin copolymer resin mixed at a weight ratio of 65:35 was used as a surface resin, the mineral oil of the core layer was added in an amount of 7 wt. %, and the thickness ratio of the surface layer, core layer and another surface layer was changed to 0.20:0.60:0.20, a film having a thickness of 10 μm was formed. As a result of measurement of the physical properties of the resulting film, it exhibited good performances as shown in Table 2.

Example 3

In the same manner as in Example 1 except that the crystalline polypropylene-based resin and a low-crystalline propylene-α-olefin copolymer resin mixed at a weight ratio of 55:45 was used as a surface resin composition and the thickness ratio of the surface layer, core layer and another surface layer was changed to 0.15:0.70;0.15, a film having a thickness of 10 μm was obtained. As a result of measurement of the physical properties of the resulting film, it exhibited good performances as shown in Table 2.

Example 4

In the same manner as in Example 1 except that used as the surface resin was a resin obtained by adding the hydrogenated terpene resin and the mineral oil in amounts of 15 parts by weight and 10 parts by weight, respectively based on 100 parts by weight of the resin composition of the surface layer formed of the crystalline polypropylene-based resin and low-crystalline propylene-α-olefin copolymer resin, a film having a thickness of 10 μm was obtained. As a result of measurement of the physical properties of the resulting film, it exhibited good performances as shown in Table 2.

Example 5

In the same manner as in Example 1 except that the crystalline polypropylene-based resin and low crystalline propylene-α-olefin copolymer resin were mixed at a weight ratio of 55:45; the hydrogenated terpene resin and mineral resin were added in amounts of 10 parts by weight and 20 parts by weight respectively, based on 100 parts by weight in total of the crystalline polypropylene-based resin and low crystalline propylene-α-olefin copolymer resin; a composition ratio of the core layer polypropylene resin and mineral oil was changed to 97:3; and a thickness ratio of the surface layer, core layer and another surface layer was changed to 0.15:0.70:0.15, a film having a thickness of 10 μm was obtained. As a result of measurement of the physical properties of the resulting film, it exhibited good performances as shown in Table 2.

Example 6

In the same manner as in Example 1 except that as the mineral oil in the resin composition of the surface layer, "MORESCO White P40" (trade name; product of Matsumura Oil Research Corp., kinetic viscosity at 40° C.: 4.4 cSt) was used in an amount of 15 parts by weight, and as the mineral oil in the resin composition of the core layer, also "MORESCO White P40" (trade name; product of Matsumura Oil Research Corp.) was used, a film having a thickness of 10 μm was obtained. As a result of measurement of the physical properties of the resulting film, it exhibited good performances as shown in Table 2.

Example 7

In the same manner as in Example 1 except that as the aliphatic hydrocarbon being liquid at normal temperature, 15 parts by weight of polybutene ("Nissan Polybutene 06SH" (having a dynamic viscosity at 40° C. of 95 cSt), trade name; product of NOF CORPORATION) was added, instead of the mineral oil, to the resin composition of the surface layer, a film having a thickness of 10 μm was obtained. As a result of measurement of the physical properties of the resulting film, it exhibited good performances as shown in Table 2.

Example 8

In the same manner as in Example 1 except for the use of 30 wt. % of a butene-1 polymer ("TAFMER BL4000", product of Mitsui Chemicals, Inc) as a softener for the resin composition of the surface layer, a film having a thickness of 10 μm was obtained. As a result of measurement of the physical properties of the resulting film, it exhibited good performances as shown in Table 2.

Example 9

In the same manner as in Example 1 except for the use of 70 wt. % of an ethylene propylene random copolymer ("PC630A", trade name; product of Sun Allomer) as the crystalline polypropylene-based resin for the resin composition of the surface layer, a film having a thickness of 10 μm was obtained. As a result of measurement of the physical properties of the resulting film, it exhibited good performances as shown in Table 2.

Example 10

In the same manner as in Example 1 except for the use of 75 wt. % of an ethylene propylene block copolymer ("Grand Polypro J705", trade name; product of Grand Polymer Co., Ltd.) as the crystalline polypropylene-based resin for the resin composition of the surface layer, a film having a thickness of 10 μm was obtained. As a result of measurement of the physical properties of the resulting film, it exhibited good performances as shown in Table 2.

Example 11

In the same manner as in Example 1 except that the raw film obtained by extrusion was stretched at a stretching ratio of 2.5 in the machine direction and 2.5 in the transverse direction, a film having a thickness of 10 μm was obtained. As a result of measurement of the physical properties of the resulting film, it exhibited good performances as shown in Table 2.

Example 12

In the same manner as in Example 1 except that the raw film was stretched at 60° C. and at a stretching ratio of 4 in the machine direction and 3 in the transverse direction, and heat setting treatment after stretching was not conducted, a film having a thickness of 10 μm was obtained. As a result of measurement of the physical properties of the resulting film, it exhibited good performances as shown in Table 2.

Comparative Example 1

In the same manner as in Example 1 except that a resin composition obtained by mixing a crystalline polypropylene-based resin and a low-crystalline polypropylene-α-olefin copolymer resin at a weight ratio of 40:60 was used as the surface layer resin and a thickness ratio of the surface layer, core layer and another surface layer was changed to 0.15:0.70:0.15, a film having a thickness of 10 μm was obtained. A volumetric ratio of three layers and the like are shown in Table 3. As a result of measurement of the physical properties of the resulting film, it exhibited excessive initial clinging property and pulling-out force as shown in Table 4.

Comparative Example 2

In the same manner as in Example 1 except that a resin composition obtained by mixing the crystalline polypropylene-based resin and low-crystalline propylene-α-olefin copolymer resin at a weight ratio of 85:15 was used for the surface layer, a film having a thickness of 10 μm was obtained. As a result of measurement of the physical properties of the resulting film, its clinging property in the initial stage was low as shown in Table 4.

Comparative Example 3

In the same manner as in Example 1 except that a resin composition obtained by adding the hydrogenated terpene resin in an amount of 20 parts by weight based on 100 parts by weight, in total, of the crystalline polypropylene-based resin and low-crystalline propylene-α-olefin copolymer resin was used for the surface layer, a film having a thickness of 10 μm was obtained. As a result of measurement of the physical properties of the resulting film, its clinging power in the initial stage was low as shown in Table 4.

Comparative Example 4

In the same manner as in Example 1 except that a resin composition obtained by adding the hydrogenated terpene resin in an amount of 2 parts by weight based on 100 parts by weight, in total, of the crystalline polypropylene-based resin and low-crystalline propylene-α-olefin copolymer resin was used for the surface layer, a film having a thickness of 10 μm was obtained. As a result of measurement of the physical properties of the resulting film, its initial clinging power in the initial stage was low as shown in Table 4.

Comparative Example 5

In the same manner as in Example 1 except that a resin composition obtained by adding 10 parts by weight of the hydrogenated terpene resin and 5 parts by weight of the mineral oil to 100 parts by weight, in total, of the crystalline polypropylene-based resin and low crystalline propylene-α-olefin copolymer resin was used for the surface layer, a film having a thickness of 10 μm was obtained. As a result of measurement of the physical properties of the resulting film, it exhibited low clinging power and high pulling-out force as shown in Table 4.

Comparative Example 6

In the same manner as in Example 1 except that a resin composition obtained by adding 10 parts by weight of the hydrogenated terpene resin and 25 parts by weight of the mineral oil to 100 parts by weight, in total, of the crystalline polypropylene-based resin and low crystalline propylene-α-olefin copolymer resin was used for the surface layer, a film having a thickness of 10 μm was obtained. As a result of measurement of the physical properties of the resulting film, it exhibited poor performances such as inferior stiffness and inferior hand feeling, as shown in Table 4, because of excessive flexibility.

Comparative Example 7

In the same manner as in Example 1 except that the weight ratio of the crystalline polypropylene-based resin and mineral oil constituting the core layer was changed to 99:1, a film of 10 μm thick was obtained. As a result of measurement of the physical properties of the resulting film, it exhibited good clinging property and pulling-out force in the initial stage as shown in Table 4, which however increased when it was allowed to stand at 40° C. for 21 days.

Comparative Example 8

In the same manner as in Example 1 except that the weight ratio of the crystalline polypropylene-based resin and mineral oil ("MORESCO WHITE P70", trade name; product of Matsumura Oil Research Corp.) serving as the aliphatic hydrocarbon being liquid at normal temperature was changed to 60:40, a film was tried to be formed. Owing to poor film forming property, however, the film was not formed.

Comparative Example 9

In the same manner as in Example 1 except that the resin composition of the core layer was changed to a 75:25 (weight ratio) resin composition of the crystalline polypropylene-based resin and low-crystalline propylene-α-olefin copolymer resin ("TAFMER XR110T", trade name; product of Mitsui Chemicals, Inc.), a film of 10 μm thick was obtained. As a result of measurement of the physical properties of the resulting film, its flexibility, and clinging property and pulling-out force in the initial stage were on the same level with those of the film obtained in Example 1 as shown in Table 4, but the clinging property and pulling-out force increased when it was allowed to stand at 40° C. for 21 days.

Comparative Example 10

A monolayer film of 10 μm thick was formed in the same manner as in Example 1 except that the film was changed to a single layer film having the surface-layer composition example 1. As a result of measurement of the physical properties of this film, it was stable in clinging property and pulling-out ease as shown in Table 4, but inferior stiffness because of excessive flexibility.

TABLE 1

|  | Polypropylene in the surface layer wt. % | Softener in the surface layer wt. % | Hydrogenated terpene resin in the surface layer parts by weight | Aliphatic hydrocarbon in the surface layer parts by weight | Polypropylene in the inner layer wt. % | Aliphatic hydrocarbon in the inner layer wt. % | Thickness of whole layer micron | Volumetric ratio of surface layer to whole layer — | Volumetric ratio of inner layer to whole layer — | Volumetric ratio of surface layer to inner layer — |
|---|---|---|---|---|---|---|---|---|---|---|
| Ex. 1 | F327 75 | 110T 25 | P125 5 | P70 15 | F327 90 | P70 10 | 10 | 0.5 | 0.5 | 1.0 |
| Ex. 2 | F327 65 | 110T 35 | P125 5 | P70 15 | F327 93 | P70 7 | 10 | 0.4 | 0.6 | 0.67 |
| Ex. 3 | F327 55 | 110T 45 | P125 5 | P70 15 | F327 90 | P70 10 | 10 | 0.3 | 0.7 | 0.43 |
| Ex. 4 | F327 75 | 110T 25 | P125 15 | P70 10 | F327 90 | P70 10 | 10 | 0.5 | 0.5 | 1.0 |
| Ex. 5 | F327 55 | 110T 45 | P125 10 | P70 20 | F327 97 | P70 3 | 10 | 0.3 | 0.7 | 0.43 |
| Ex. 6 | F327 75 | 110T 25 | P125 5 | P40 15 | F327 90 | P40 10 | 10 | 0.5 | 0.5 | 1.0 |
| Ex. 7 | F327 75 | 110T 25 | P125 5 | 06 SH 15 | F327 90 | P70 10 | 10 | 0.5 | 0.5 | 1.0 |
| Ex. 8 | F327 70 | BL4000 30 | P125 5 | P70 15 | F327 90 | P70 10 | 10 | 0.5 | 0.5 | 1.0 |
| Ex. 9 | PC630 70 | 110T 30 | P125 5 | P70 15 | F327 90 | P70 10 | 10 | 0.5 | 0.5 | 1.0 |
| Ex. 10 | J705 75 | 110T 25 | P125 5 | P70 15 | F327 90 | P70 10 | 10 | 0.5 | 0.5 | 1.0 |
| Ex. 11 | F327 75 | 110T 25 | P125 5 | P70 15 | F327 90 | P70 10 | 10 | 0.5 | 0.5 | 1.0 |
| Ex. 12 | F327 75 | 110T 25 | P125 5 | P70 15 | F327 90 | P70 10 | 10 | 0.5 | 0.5 | 1.0 |

TABLE 2

| Unit | Cling energy after film formation — | Pulling-out force 24 hrs. after film formation — | Change in cling energy after film is allowed to stand at 40° C. for 21 days — | Change in pulling-out force after film is allowed to stand at 40° C. for 21 days — | Heat resistance — | Transparency — | Flexibility — | Hand feeling — | Cutting ease — | Network structure — | Average width of fibril nm | average size of matrix nm |
|---|---|---|---|---|---|---|---|---|---|---|---|---|
| Ex. 1 | A | A | A | A | A | A | A | A | A | present | A | A |
| Ex. 2 | A | A | A | A | A | A | A | A | A | present | A | A |
| Ex. 3 | A | A | A | A | A | A | A | A | A | present | A | B |
| Ex. 4 | B | B | A | A | A | A | A | A | A | present | A | A |
| Ex. 5 | A | A | B | B | A | A | A | A | A | present | A | A |
| Ex. 6 | B | B | A | A | A | A | A | A | A | present | A | A |
| Ex. 7 | B | B | A | A | A | A | A | A | A | present | A | A |
| Ex. 8 | A | A | A | A | A | A | A | A | A | present | A | A |
| Ex. 9 | A | A | A | A | A | A | A | A | A | present | A | A |
| Ex. 10 | A | A | A | A | A | B | B | A | A | present | A | A |
| Ex. 11 | B | B | A | A | A | A | B | B | B | absent | — | — |
| Ex. 12 | B | B | A | A | A | A | A | A | A | present | C | C |

TABLE 3

| Unit | Polypropylene in the surface layer wt. % | Softener in the surface layer wt. % | Hydrogenated terpene resin in the surface layer parts by weight | Aliphatic hydrocarbon in the surface layer parts by weight | Polypropylene in the inner layer wt. % | Aliphatic hydrocarbon in the inner layer wt. % | Another resin in the inner layer wt. % | Thickness of whole layer micron | Volumetric ratio of surface layer to whole layer — | Volumetric ratio of inner layer to whole layer — | Volumetric ratio of surface layer to inner layer — |
|---|---|---|---|---|---|---|---|---|---|---|---|
| Comp. Ex. 1 | F327 40 | 110T 60 | P125 5 | P70 15 | F327 90 | P70 10 | — | 10 | 0.3 | 0.7 | 0.43 |
| Comp. Ex. 2 | F327 85 | 110T 15 | P125 5 | P70 15 | F327 90 | P70 10 | — | 10 | 0.5 | 0.5 | 1.0 |
| Comp. Ex. 3 | F327 75 | 110T 25 | P125 20 | P70 15 | F327 90 | P70 10 | — | 10 | 0.5 | 0.5 | 1.0 |
| Comp. | F327 | 110T | P125 | P70 | F327 | P70 | | 10 | 0.5 | 0.5 | 1.0 |

TABLE 3-continued

| Unit | Polypropylene in the surface layer wt. % | Softener in the surface layer wt. % | Hydrogenated terpene resin in the surface layer parts by weight | Aliphatic hydrocarbon in the surface layer parts by weight | Polypropylene in the inner layer wt. % | Aliphatic hydrocarbon in the inner layer wt. % | Another resin in the inner layer wt. % | Thickness of whole layer micron | Volumetric ratio of surface layer to whole layer | Volumetric ratio of inner layer to whole layer | Volumetric ratio of surface layer to inner layer |
|---|---|---|---|---|---|---|---|---|---|---|---|
| Ex. 4 | 75 | 25 | 2 | 15 | 90 | 10 | — | 10 | 0.5 | 0.5 | 1.0 |
| Comp. Ex. 5 (materials) | F327 | 110T | P125 | P70 | F327 | P70 | — | | | | |
| Comp. Ex. 5 | 75 | 25 | 10 | 5 | 90 | 10 | | 10 | 0.5 | 0.5 | 1.0 |
| Comp. Ex. 6 (materials) | F327 | 110T | P125 | P70 | F327 | P70 | — | | | | |
| Comp. Ex. 6 | 75 | 25 | 10 | 25 | 90 | 10 | | 10 | 0.5 | 0.5 | 1.0 |
| Comp. Ex. 7 (materials) | F327 | 110T | P125 | P70 | F327 | P70 | — | | | | |
| Comp. Ex. 7 | 75 | 25 | 5 | 15 | 99 | 1 | | 10 | 0.5 | 0.5 | 1.0 |
| Comp. Ex. 8 (materials) | F327 | 110T | P125 | P70 | F327 | P70 | — | | | | |
| Comp. Ex. 8 | 75 | 25 | 5 | 15 | 60 | 40 | | 10 | 0.5 | 0.5 | 1.0 |
| Comp. Ex. 9 (materials) | F327 | 110T | P125 | P70 | F327 | — | 110T | | | | |
| Comp. Ex. 9 | 75 | 25 | 5 | 15 | 75 | | 25 | 10 | 0.5 | 0.5 | 1.0 |
| Comp. Ex. 10 (materials) | F327 | 110T | P125 | P70 | — | — | — | | | | |
| Comp. Ex. 10 | 75 | 25 | 5 | 15 | | | | 10 | 1.0 | 0.0 | — |

TABLE 4

| Unit | Cling energy after film formation | Pulling-out force 24 hrs. after film formation | Change in cling energy after film is allowed to stand at 40° C. for 21 days | Change in pulling-out force after film is allowed to stand at 40° C. for 21 days | Heat resistance | Transparency | Flexibility | Hand feeling | Cutting ease | Network structure | Average width of fibril nm | Average size of matrix nm |
|---|---|---|---|---|---|---|---|---|---|---|---|---|
| Comp. Ex. 1 | C | C | C | C | C | B | D | C | C | present | A | C |
| Comp. Ex. 2 | C | B | C | C | A | B | D | C | A | present | A | A |
| Comp. Ex. 3 | C | C | D | D | A | A | A | A | A | present | A | A |
| Comp. Ex. 4 | C | B | C | A | A | A | A | A | A | present | A | B |
| Comp. Ex. 5 | D | D | D | D | A | A | A | A | A | present | A | A |
| Comp. Ex. 6 | B | B | B | B | A | A | D | D | A | present | A | A |
| Comp. Ex. 7 | B | B | C | C | A | A | A | A | A | present | A | A |
| Comp. Ex. 8 | Film could not be formed | | | | | | | | | | | |
| Comp. Ex. 9 | B | B | C | C | A | A | A | A | A | present | A | A |
| Comp. Ex. 10 | B | B | A | A | B | A | D | D | B | present | A | A |

Abbreviations in the table have the following meanings:

Ex.=Example, Comp. Ex.=Comparative Example

F327: Crystalline polypropylene-based resin ("Grand Polypro F327", trade name; product of Grand Polymer Co., Ltd., MFR=7.0 g/10 min.)

PC630: Homopolypropylene resin ("PC630A", trade name; product of Sun Allomer Co., Ltd., MFR=7.5 g/10 min.)

J705=Crystalline block polypropylene resin ("Grand Polypro J705", trade name; product of Grand Polymer Co., Ltd., MFR=10 g/10 min)

110T =Low-crystalline propylene-α-olefin copolymer resin ("TAFMER XR110T", trade name; product of Mitsui Chemicals, Inc., MFI=6.0 g/10 min. (230° C.), density: 0.890 g/cc)

BL4000=butene-1 copolymer ("TAFMER BL4000", trade name; product of Mitsui Chemicals, Inc., MFR=1.8 g/10 min, density: 0.915 g/cc)

P125=Hydrogenated terpene resin ("Clearon P125", trade name; product of Yasuhara Chemical-Co., Ltd.)

P70=Mineral oil ("Smoil P70", trade name; product of Mtsumura Oil Research, kinetic viscosity: 12.35 (40° C. cSt)

P40=Mineral oil ("MORESCO WHITE P-40", trade name; product of Matsumura Oil Research, kinetic viscosity: 4.3 (40° C., cSt)

06SH=Aliphatic hydrocarbon being liquid at normal temperature ("Nissan Polybutene 06SH", trade name; product of NOF CORPORATION, kinetic viscosity: 95 (40° C. cSt))

According to the present invention, a polypropylene-based multilayer film excellent in the balance of clinging property and pulling-out ease, undergoes a less time-dependent change in these performances, and is excellent in transparency, heat resistance, flexibility, hand feeling, and cutting ease can be provided. The film is usable suitably as a food packaging wrap film.

What is claimed is:

1. A polypropylene-based multilayer wrap film comprising:
   (A) a surface layer containing a first composition comprising 50 to 80 wt. % of (S1) a crystalline polypropylene-based resin and 20 to 50 wt. % of (S2) at least one softener selected from amorphous or low-crystalline propylene-α-olefin copolymers and butene-1 polymers, and based on 100 parts by weight of the first composition, 5 to 15 parts by weight of (S3) a hydrogenated terpene resin and 10 to 20 parts by weight of (S4) an aliphatic hydrocarbon which is liquid at normal temperature; and
   (B) a core layer which is adjacent to the surface layer and contains 80 to 98 wt. of (C1) a crystalline polypropylene-based resin and 2 to 20 wt. % of (C2) an aliphatic hydrocarbon which is liquid at normal temperature.

2. The polypropylene-based multilayer wrap film of claim 1, wherein at 23° C. and RH of 50%, a cling energy ranges from 1.0 to 3.0 mJ and a pulling-out force ranges from 200 to 1000 mN.

3. The polypropylene-based multilayer wrap film of claim 1 or 2, wherein between before and after the wrap film wound around a paper tube is allowed to stand for 3 weeks at 40° C. and RH of 20%, a change in the cling energy falls within a range of −20 to +50% and a change in the pulling-out force falls within a range of −50 to +20%.

4. The polypropylene-based multilayer wrap film of claim 3, which has a structure, when the surface of the film is observed as a phase image of an atomic force microscope at 40,000 magnifications, formed of a fibril network and a matrix existing therebetween, and the fibril has an average width of 1 nm or greater but not greater than 100 nm and has an average fibril-to-fibril distance of 3 nm or greater but not greater than 1 μm.

5. The polypropylene-based multilayer wrap film of claim 1 or 2, which has been stretched at a stretching ratio of 2 or greater in the machine direction and/or transverse direction.

6. The polypropylene-based multilayer wrap film of claim 1 or 2, having an overall thickness ranging from 3 to 25 μm.

* * * * *